United States Patent [19]

Iwasaki

[11] 4,010,548
[45] Mar. 8, 1977

[54] SHOCK-ABSORBING MECHANISM FOR DIAL GAGE

[75] Inventor: Shozo Iwasaki, Ebina, Japan

[73] Assignee: Kabushiki Kaisha Akashi Seisakusho, Japan

[22] Filed: Mar. 3, 1976

[21] Appl. No.: 663,296

[30] Foreign Application Priority Data

Mar. 24, 1975 Japan .............................. 50-35085

[52] U.S. Cl. ............................................ 33/172 R
[51] Int. Cl.² ........................................ G01D 5/02
[58] Field of Search ........................ 73/430, 432 A; 116/129 R; 33/172 R, 172 A

[56] References Cited

UNITED STATES PATENTS

| | | | |
|---|---|---|---|
| 2,527,173 | 10/1950 | Boat ................................ | 33/172 A |
| 2,645,857 | 7/1953 | Andersson ....................... | 33/172 R |
| 3,899,931 | 8/1975 | Iwasaki ........................... | 33/172 R |

*Primary Examiner*—S. Clement Swisher
*Attorney, Agent, or Firm*—Robert E. Burns; Emmanuel J. Lobato; Bruce L. Adams

[57] ABSTRACT

A shock-absorbing mechanism for use in a dial gage where longitudinal motion of the spindle is converted to rotational motion of a pointer shaft gear by a pinion shaft rotated by said spindle and a magnifying gear coaxially and idlingly meshed with said pinion shaft, comprising a star-shaped pressure spring with radiately extending, elastic branches having not only elasticity in the axial direction of said pinion shaft but also high rigidity in the rotating direction thereof, and a dished spring bearing to deform said pressure spring so as to provide said axial elasticity, said star-shaped pressure spring and dished spring bearing being disposed coaxially with said magnifying gear and a stopper ring fixed on said pinion shaft so that the magnifying gear is pressed against the stopper ring in a frictionally contacted manner.

1 Claim, 3 Drawing Figures

SHOCK-ABSORBING MECHANISM FOR DIAL GAGE

BACKGROUND OF THE INVENTION

Field of Invention

This invention relates to a shock-absorbing mechanism for use in a dial gage, and more particularly to one that is provided in such portion of a dial gage where rectilinear motion of the spindle is converted to rotational motion that is then transmitted to the gear on the pointer shaft.

DESCRIPTION OF PRIOR ART

Generally, in this type of dial gage, a spindle slidably fitted to the dial gage proper is adapted to move in its longitudinal direction in accordance with the displacement on the piece being measured, then this rectilinear motion of the spindle is changed to rotational motion by means of a rack, pinion or the like, and thence transmitted to a gear mounted on the pointer shaft through a magnifying gear. In the conventional dial gage, however, the magnifying gear that rotates the pointer shaft gear is fixedly mounted on the pinion shaft that is rotated by the spindle. As a consequence, in case the spindle is subjected to a sudden displacement, impulsive force acts on the teeth cut on one side of the spindle and the gear on the pinion shaft that is engaged with said teeth, whereby the teeth of the spindle and pinion are deformed to lower the accuracy of the dial gage.

SUMMARY OF THE INVENTION

The object of this invention is to furnish a solution for such problem through the provision of a shock-absorbing mechanism for a dial gage that is so designed as to prevent the damaging of the gears and other elements, which might be caused by the sudden movement of the spindle, by giving rise to slippage in the transmission of torque from the pinion shaft to the pointer shaft gear.

In order to achieve this object, the dial gage shock-absorbing mechanism according to this invention comprises, in combination, a pinion shaft adapted to be rotated by a spindle that moves along a straight line, a magnifying gear coaxially and idlingly meshed with the pinion shaft so as to rotate a gear on a pointer shaft, a star-shaped pressure spring with radiately extending, elastic branches having not only elasticity in the axial direction of said pinion shaft but also high rigidity in the rotating direction thereof, and a dished spring bearing to provide said pressure spring with said axial elastic deformation, the last-mentioned two elements being mounted on said pinion shaft coaxially with a stopper ring fixed thereon and said magnifying gear so as to press the latter against the former in a frictionally contacted manner.

In the above-described dial gage shock-absorbing mechanism of this invention, normal movement of the spindle surely rotates the pointer shaft gear through that portion of the pinion shaft where the stopper ring and magnifying gear are frictionally contacting with each other. But when a sudden driving force acts on the spindle, a slippage occurs in said frictionally contacting portion, whereby the shock in every part through which the movement of the spindle is transmitted is sufficiently relieved.

Also, said pressure spring having radiately extending elastic branches used in this shock-absorbing mechanism is elastically deformed in the axial direction of said pinion shaft by means of the dished spring bearing coaxially disposed therewith. Accordingly, the pressure spring can be manufactured with ease, for example, by simply stamping at flat, elastic material into a star-shaped piece.

BRIEF DESCRIPTION OF THE DRAWING

Now a dial gage shock-absorbing mechanism embodying this invention will be described with reference to the accompanying drawings, in which.

DESCRIPTION OF PREFERRED EMBODIMENTS

Figure 1:
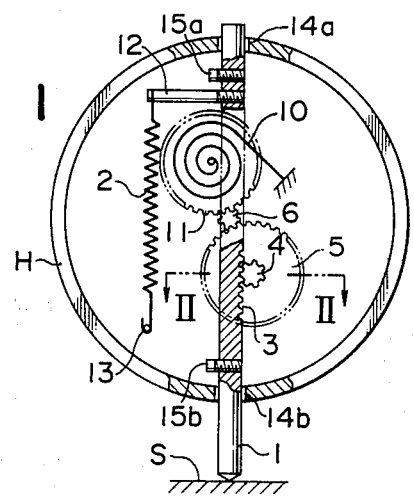
FIG. 1 is a rear view of the dial gage, with a part thereof cut open.

A spindle 1 is fitted to an indicator proper H through a spring 2, so that the spindle 1 is capable of axially moving according to the displacement on a measured surface S, with one end of the spindle 1 contacting with the surface S.

A pinion shaft 4 is meshed with the teeth 3 cut on said spindle 1 so as to be rotated by the axial movement thereof. A magnifying gear 5 is coaxially mounted on the spindle shaft 4.

At the center of the indicator proper H is provided a pointer shaft gear 6 that is meshed with the magnifying gear 5. A pointer (not shown) is fitted to the shaft of this pointer shaft gear 6.

The magnifying gear 5 is coaxially and idlingly fitted to the pinion shaft 4. The pinion shaft 4 carries also a pressure spring 7 and a dished spring bearing 8a, disposed between a slide ring 8b and the magnifying gear 5, all coaxially, so that the magnifying gear 5 is pressed against a stopper ring 9 fixed on the pinion shaft 4 in a frictionally contacted manner.

Figure 2:
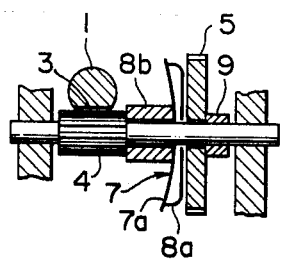
FIG. 2 is a cross-sectional view taken along the line II—II in FIG. 1.
Figure 3:
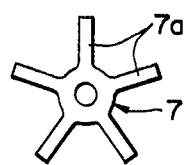
FIG. 3 is a front view showing a star-shaped pressure spring used in this shock-absorbing mechanism.

The pressure spring 7 is star-shaped, having radiately extending branches 7a, as illustrated in FIG. 3. The edge of the dished spring bearing 8a arches the radiately extending branches 7a, thus providing elastic deformation to the pressure spring 7 in the axial direction of the pinion shaft 4, as shown in FIG. 2.

Owing to this assembly, the star-shaped pressure spring 7, which is rather complicated in shape, can be manufactured easily by blanking a flat, elastic material.

The star-shaped pressure spring 7 thus arranged has not only elasticity in the axial direction of the pinion shaft 4, but also high rigidity in the direction in which the pinion shaft 4 rotates.

The pointer shaft gear 6 is meshed with an auxiliary gear 11 urged by a hair spring 10, in order that the backlash in the gear mechanism is prevented.

In the figures, reference numeral 12 denotes a spring peg through which one end of the spring 2 is fitted to the spindle 1, and 13 a spring peg through which the other end of the spring 2 is fitted to the indicator proper H. Items 14a and 14b are bearings through which the spindle 1 is slidably fitted to the indicator proper H, while items 15a and 15b are stoppers fixed on the spindle 1. Contacting of these stoppers 15a and 15b with the interior wall of the indicator proper H limits the moving range of the spindle 1.

Composed as described above, when the spindle 1 moves gently following the displacement on the surface S being measured, its rectilinear motion is converted to the rotational motion of the pinion shaft 4 meshed with the teeth 3, whereby the pointer shaft gear 6 is surely rotated through the portion where the stopper ring 9 and the magnifying gear 5 frictionally contact with each other.

But when the spindle 1 moves violently, forcibly pushed by the surface S, a slippage occurs in the frictionally contacting portion between the stopper ring 9 and the magnifying gear 5, thus preventing damaging of the teeth 3 and the teeth on the gears 4, 5 and 6.

In addition, the torque transmittability at the frictionally contacting portion between the magnifying gear 5 and the stopper ring 9 may be adjusted by adopting the slide ring 8b of the removable design, so that a suitable one may be selected out of the rings of various thicknesses. Or, by changing the pressure spring 7 itself from one having some force to another having different force, as required.

As understood from the above detailed description, the dial gage shock-absorbing mechanism of this invention can sufficiently relieve the shock and thus prevent all component parts from being damaged, even when the spindle 1 is subjected to sudden displacement. This insures maintenance of high accuracy in normal measurement performed by the dial gage. Another advantage of this invention is that the pressure spring, which is one of the essential elements of this mechanism, can be manufactured easily.

What is claimed is:

1. A shock-absorbing mechanism for use in a dial gage having a pinion shaft rotated by a spindle that moves along a straight line and a magnifying gear coaxially and idlingly meshed with the pinion shaft so as to rotate a pointer shaft gear, which comprises a star-shaped pressure spring with radiately extending, elastic branches having not only elasticity in the axial direction of said pinion shaft but also high rigidity in the rotating direction thereof, and a dished spring bearing to deform said pressure spring so as to provide said axial elasticity, said star-shaped pressure spring and dished spring bearing being disposed coaxially with said magnifying gear and a stopper ring fixed on said pinion shaft so that the magnifying gear is pressed against the stopper ring in a frictionally contacted manner.

* * * * *